United States Patent [19]

Prescott

[11] Patent Number: 5,089,914
[45] Date of Patent: Feb. 18, 1992

[54] THERMAL CAMERA ARRANGEMENT

[75] Inventor: John A. Prescott, Colchester, United Kingdom

[73] Assignee: EEV Limited, Chelmsford, United Kingdom

[21] Appl. No.: 589,040

[22] Filed: Sep. 27, 1990

[30] Foreign Application Priority Data

Oct. 2, 1989 [GB] United Kingdom ................ 8922146
Dec. 8, 1989 [GB] United Kingdom ................ 8927799

[51] Int. Cl.$^5$ .............................................. G02B 7/02
[52] U.S. Cl. .................................... 359/815; 359/894; 2/6; 2/5
[58] Field of Search ............... 350/248, 319, 321, 257; 2/5, 6, 7

[56] References Cited

U.S. PATENT DOCUMENTS 4,215,437 8/1980 Kao .............................................. 2/5
4,670,912 6/1987 Hart .................................... 359/815

FOREIGN PATENT DOCUMENTS 206324 12/1986 European Pat. Off. .
2651217 4/1978 Fed. Rep. of Germany .............. 2/5
1478342 6/1977 United Kingdom .
1533859 11/1978 United Kingdom .
2062285 5/1981 United Kingdom .
2100466 12/1982 United Kingdom .

*Primary Examiner*—Loha Ben
*Attorney, Agent, or Firm*—Spencer & Frank

[57] ABSTRACT

A thermal camera is mounted within a helmet and is arranged such that the optical path in free space from its output is wholly within the volume defined by the helmet and the helmet faceplate. The output iminges on a concave mirror/lens combination located below the wearer's sightline. The arrangement is particularly suitable for fire fighting and search and rescue applications.

19 Claims, 2 Drawing Sheets

THERMAL CAMERA ARRANGEMENT

BACKGROUND OF THE INVENTION

This invention relates to thermal camera arrangements and more particularly to arrangements which enable an operator to use a thermal camera whilst being free to use his hands.

Thermal cameras produce visible images representative of the thermal intensity of viewed scenes. They are particularly useful in fire fighting and search and rescue applications as they enable an operator to see through darkness or dense smoke.

At present, a compact hand-held thermal camera is available which has proved to be of great value. The present invention arose in an attempt to provide improved thermal camera apparatus which is of greater assistance especially for those applications listed above.

SUMMARY OF THE INVENTION

According to the invention a thermal camera arrangement comprises a helmet having a faceplate and a thermal camera mounted on the helmet arranged such that a wearer of the helmet can view the output of the camera, the optical path through free space from the camera output to the wearer's eye being substantially wholly within a volume defined by the helmet and the faceplate. Such an arrangement enables the operator to utilise the information provided from the thermal camera whilst leaving his hands free to carry out other tasks. Also, by ensuring that the optical path through free space is within the volume, the difficulty in preventing smoke, for example, intervening between the output of the camera and the viewer's eye may be reduced or eliminated.

It is also preferred that the faceplate is integral with the helmet, the faceplate being permanently fixed to the helmet and being surrounded by it. It is also preferred that the helmet and faceplate substantially wholly enclose the wearer's head. This gives maximum protection to the wearer and effectively isolates the volume defined by the helmet and the faceplate from the environment, and hence from any smoke or other substance which may attenuate the output from the camera.

It is preferred that the arrangement enables both eyes of the wearer to view the output of the camera.

Advantageously, the output of the camera is reflected from a surface within the volume before impinging on the wearer's eye. The surface may be a silvered portion of the faceplate or may be a separately provided mirror. The mirrored surface may be fully or half silvered, the latter enabling the wearer to view the output of the camera superimposed on the external scene. In one advantageous embodiment of the invention, the surface is located below the sightline of the wearer when he is looking ahead. Thus, by looking ahead normally he sees the scene unaided by the thermal camera and by looking down he sees the output of the camera.

In a particularly advantageous embodiment of the invention a lens is included in the optical path between the camera output and the wearer's eye, to enable the image to be more easily focussed. The lens may be located adjacent to the camera output but preferably it is combined with the mirrored surface, which may be deposited on a surface of the lens. It is preferred that the lens is of a plastic material, such as for example a polycarbonate material which, compared to a glass component, reduces the risk of injury to the wearer should it be damaged.

It is preferred that when a mirror/lens combination is used it is concave, enabling the image to be easily focussed, even if the mirror is only a short distance in front of the wearer.

The invention is particularly advantageously used where the helmet is one which includes breathing apparatus, especially of the type which requires a seal around the face. If a mirror or mirror/lens combination is included, it may be mounted at an intake of the breathing apparatus, where this is included, as forward vision is restricted in this region in any case. Where a mask covering the wearer's nose and mouth is employed, the mirror or mirror/lens combination may be conveniently mounted on the mask, conforming to its outer surface.

In some embodiments of the invention, where breathing apparatus is included, a window may be provided in a seal to allow the viewing output of the camera to be transmitted along a desired path. It may be advantageous to use a lens as the window.

Preferably, the camera is removably fixed to the helmet, enabling it to be removed if maintenance is required or to be fitted to different helmets in turn. Advantageously, the camera body is substantially wholly located within the helmet, preferably being located within a compartment separate from the wearer's head. If a protective harness is included to prevent the head from coming into contact with the helmet wall, the camera is preferably positioned between the harness and the helmet wall. Although it is preferred that the camera is only removable from within the helmet when it is not being worn, it may be mounted so as to be externally accessible.

Preferably, the camera is positioned such that its faceplate is located above the eyeline of the wearer of the helmet.

Advantageously, the camera is such that the direction of its viewing output is at an acute angle to its boresight direction. Such a "folded" configuration is compact and particularly suitable for the inventive arrangement.

BRIEF DESCRIPTION OF DRAWINGS

One way in which the invention may be performed is now described by way of example with reference to the accompanying drawings in which.

DESCRIPTION OF PREFERRED EMBODIMENT

Figure 1:
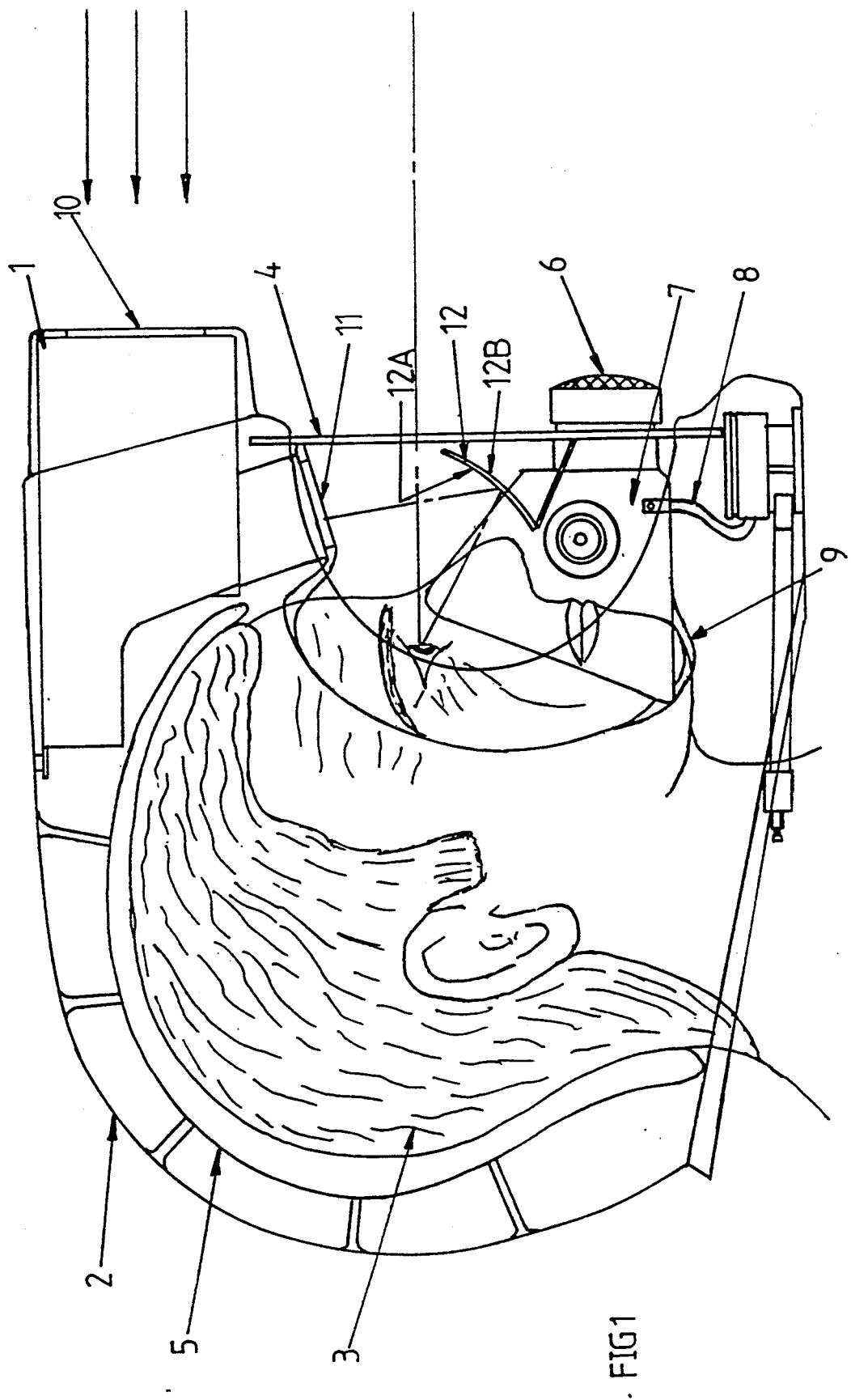
FIG. 1 is a schematic sectional view of a thermal camera arrangement in accordance with the invention.
Figure 2:
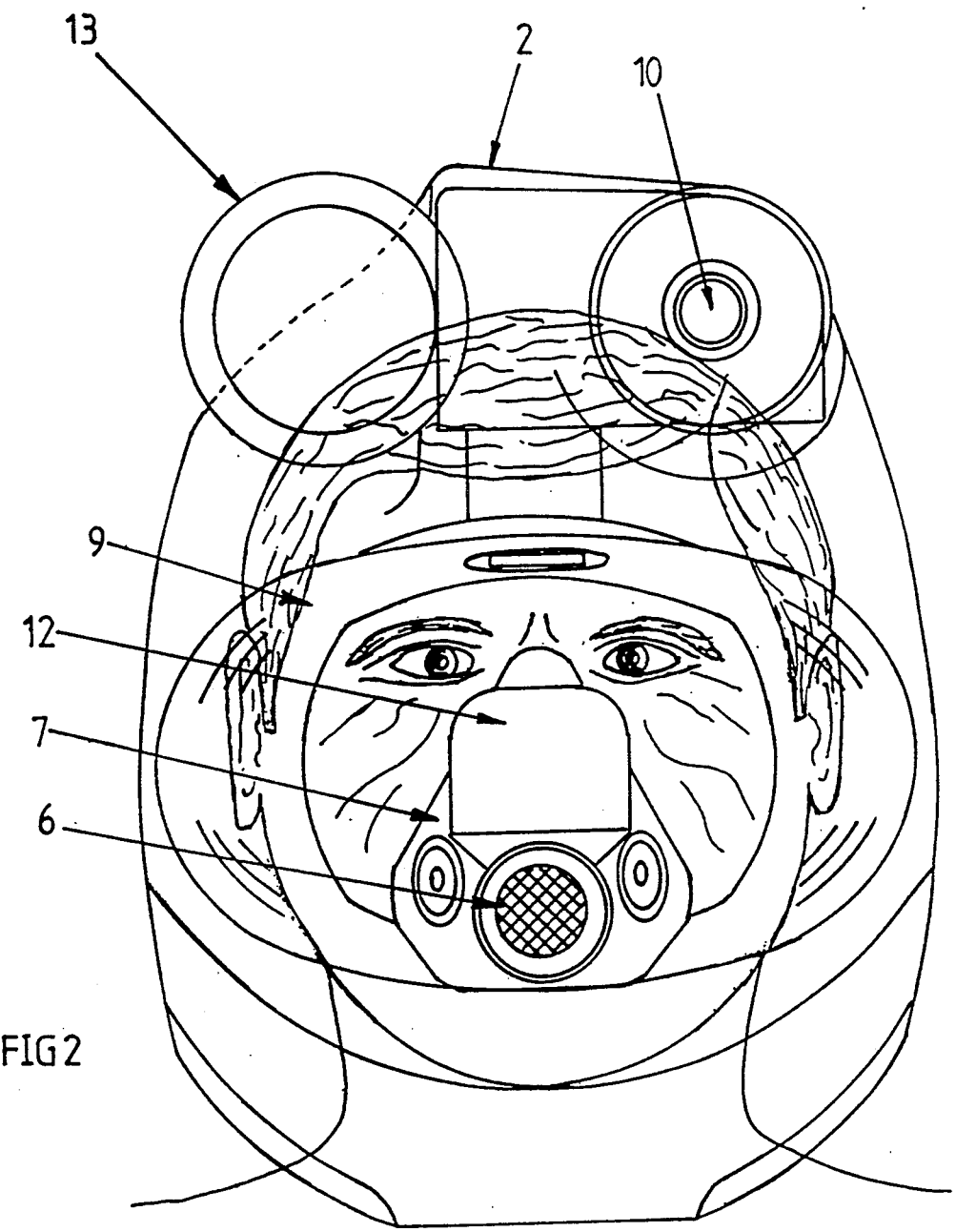
FIG. 2 is a schematic front view of the arrangement shown in FIG. 1.

With reference to FIGS. 1 and 2, a thermal camera arrangement includes a thermal camera 1 mounted on a helmet 2 which completely encloses the head of a wearer 3. The helmet 2 includes an integral faceplate 4 which is large enough to afford the operator 3 extensive forward and sideways vision. A protective harness 5 attached to the inside of the helmet 2 cushions the wearer's head from blows to the helmet 2.

The helmet 2 also incorporates breathing apparatus having an exhaust diaphragm 6, mask 7 which covers the nose and mouth and pipes 8 leading an air supply. A seal 9 surrounds the face of the operator.

The thermal camera 1 is removably mounted within the helmet 2, being located in part of the space between the helmet wall and the protective harness 5. The camera faceplate 10 on which incident thermal radiation impinges is located above the eyeline of the wearer, as can be seen in FIG. 2. The camera 1 is of a "folded" configuration such that its boresight direction and the direction of its viewing output are at an acute angle to each other. The output of the camera 1 is passed via a sealing window 11, which in this embodiment is also a lens, in the face seal 9 and impinges on a concave mirror/lens combination 12, the light being transmitted through the lens 12A and being reflected by its silvered rear surface 12B. The mirror/lens combination 12 is attached to the mask 7 and has a surface which conforms to the outer surface of the mask 7.

The mirror/lens combination 12 is located below the forward sightline of the wearer 3. Thus, as shown in FIG. 1, by looking straight ahead, the operator sees the scene without the aid of the camera 1 and by looking down he sees the camera output. The mirror/lens combination 12 is so positioned that both eyes can see the image from the camera 1 without difficulty.

In this particular arrangement, a cap lamp 13 may also be included, as shown in FIG. 2, being located above the right eye of the wearer and arranged to illuminate the viewed scene. The lamp 13 is useful for conditions in which smoke or other obscuring gases are not present.

In an alternative embodiment of the invention, a cap lamp which is interchangeable with the thermal camera may be available, so that the appropriate equipment may be chosen depending on conditions.

I claim:

1. A thermal camera arrangement comprising: a helmet; a faceplate attached to said helmet; and a thermal camera mounted on said helmet such that a radiation output of said camera is viewable by a wearer of said helmet via an optical path through free space from the camera output to the wearer's eye, said optical path being substantially wholly within a volume defined by said helmet and said faceplate.

2. An arrangement as claimed in claim 1, wherein said faceplate is integral with said helmet.

3. An arrangement as claimed in claim 1, wherein said helmet and faceplate substantially wholly enclose the wearer's head.

4. An arrangement as claimed in claim 1, and including a reflective surface within, or defining, the volume, the surface being located such that the output of said camera is reflected therefrom before impinging on the wearer's eye.

5. An arrangement as claimed in claim 4, wherein said surface is located below the sightline of the wearer when he is looking ahead.

6. An arrangement as claimed in claim 4, wherein said surface is a concave mirror.

7. An arrangement as claimed in claim 1, and including a lens in the optical path.

8. An arrangement as claimed in claim 7, wherein said lens has a reflective surface at which the output of the camera is reflected.

9. An arrangement as claimed claim 1, wherein the arrangement is such that the output of the camera is visible to both eyes of the wearer.

10. An arrangement as claimed in claim 1, and including breathing apparatus integral with said helmet.

11. An arrangement as claimed in claim 10, and including a seal for fitting around the face of the wearer.

12. An arrangement as claimed in claim 11, wherein said seal includes a light transmissive portion through which the output of said camera is transmitted.

13. An arrangement as claimed in claim 12, wherein said portion is a lens.

14. An arrangement as claimed in claim 10, wherein the breathing apparatus includes an intake at which a reflective surface is located, said surface reflecting the output of said camera to the wearer's eye.

15. An arrangement as claimed in claim 1, wherein said camera is removably fixed to said helmet.

16. An arrangement as claimed in claim 1, wherein said camera is substantially wholly located within said helmet.

17. An arrangement as claimed in claim 16, and including protective harness for cushioning the wearer's head from impact with the helmet walls, said camera being located between said harness and the walls.

18. An arrangement as claimed in claim 1, wherein said camera is positioned such that its faceplate is located above the eyeline of the wearer.

19. An arrangement as claimed in claim 1, wherein the direction of the output of said camera is at an acute angle to its boresight direction.

* * * * *